United States Patent [19]

Mindel et al.

[11] 4,287,689
[45] Sep. 8, 1981

[54] METHOD FOR IMPROVING THE QUALITY OF LOW FREQUENCY OUTPUT OF A VIDEO DISC PICKUP STYLUS

[75] Inventors: Michael J. Mindel, Camby; Michael E. Miller; James C. Rustman, both of Indianapolis, all of Ind.; Richard C. Palmer, Blawenburg, N.J.

[73] Assignee: RCA Corporation, New York, N.Y.

[21] Appl. No.: 89,479

[22] Filed: Oct. 30, 1979

[51] Int. Cl.³ .......................... B24C 1/04; B24C 1/08
[52] U.S. Cl. ....................................... 51/320; 51/321; 369/71; 369/126
[58] Field of Search ................. 51/310, 319, 320, 321, 51/413; 29/603; 179/100.1 G

[56] References Cited

U.S. PATENT DOCUMENTS

| | | | |
|---|---|---|---|
| 3,247,572 | 4/1966 | Munk | 51/310 |
| 3,514,851 | 6/1970 | Perkins | 51/319 X |
| 3,516,204 | 6/1970 | Kulischenko | 51/413 |
| 3,750,341 | 8/1973 | Matthews | 51/310 |
| 3,826,877 | 7/1974 | Leedom | 179/100.1 B |
| 3,842,194 | 10/1974 | Clemens | 178/6.6 A |
| 3,882,641 | 5/1975 | Montgomery | 51/310 |
| 4,049,280 | 9/1977 | Leedom | 274/37 |
| 4,078,300 | 3/1978 | Lazzari | 29/603 |
| 4,104,832 | 8/1978 | Keizer | 51/281 R |
| 4,162,510 | 7/1979 | Keizer | 358/128 |

FOREIGN PATENT DOCUMENTS 7713818 12/1978 Netherlands ...................... 51/320

*Primary Examiner*—Gary L. Smith
*Attorney, Agent, or Firm*—Birgit E. Morris; Allen Bloom

[57] ABSTRACT

The quality of the low frequency signals recovered by a playback stylus may be improved by removing non-electrode metal deposits. A stream slurry lapper with a slurry of alumina in water can be used.

5 Claims, 4 Drawing Figures

METHOD FOR IMPROVING THE QUALITY OF LOW FREQUENCY OUTPUT OF A VIDEO DISC PICKUP STYLUS

The invention relates to a method of fabricating a video disc playback stylus. More particularly, this invention relates to a method for improving the quality of the low frequency output of a video disc pickup stylus by removing unwanted metal deposits.

BACKGROUND OF THE INVENTION

U.S. Pat. No. 3,842,194 of Jon K. Clemens disclosed a video disc having a playback system utilizing variable capacitance. In one configuration of the Clemens system information representative of recorded picture and sound is encoded in the form of a relief pattern in a relatively fine spiral groove on the surface of a disc record. For example, groove widths about 3.5 micrometers and groove depths of about 1.0 micrometer may be used. During playback a pickup stylus about 2.0 micrometers wide having a thin conductive electrode thereon, for example, about 0.2 micrometer thick, engages the groove as the record is rotated by a supportive turntable. Capacitive variations between the stylus electrode and the record surface are sensed to recover the pre-recorded information.

In the system of the above type the use of a relatively fine record groove and the groove engaging requirements for the pickup stylus results in a stylus tip which is extremely small. In U.S. Pat. No. 4,162,510 to Keizer entitled, "Keel-Tipped Stylus for Video Disc Systems," incorporated herein by reference, a novel keel-tipped pickup stylus structure is disclosed. It has been found, however, that during the playback of a capacitive video disc using this stylus, there is considerable variation in the amplitude of the low frequency signals, especially the audio signals, picked up by the stylus. These variations are accompanied by a hissing sound which is unacceptable for a commercial consumer product.

SUMMARY OF THE INVENTION

We have found that removing nonelectrode metal deposits improves the low frequency response of a video disc playback stylus as well as eliminates an undesirable hissing sound.

DETAILED DESCRIPTION OF THE INVENTION

Figure 1:
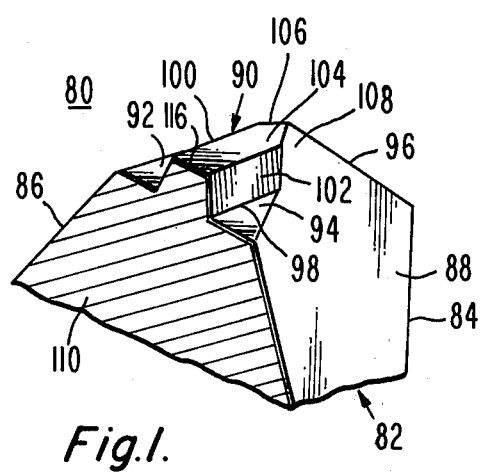
FIGS. 1 and 2 are views of a keel-tipped video disc playback stylus.
Figure 2:
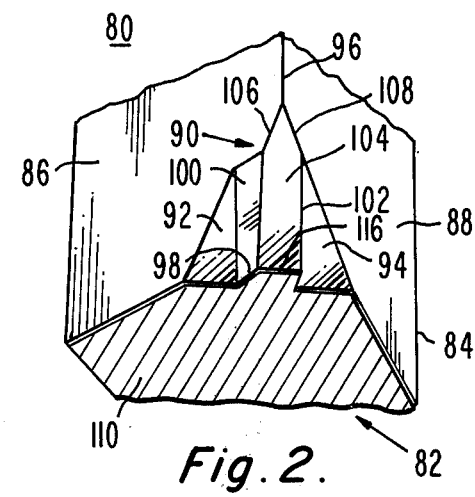

FIGS. 1 and 2 show the perspective view of a keel-tipped stylus 80 disclosed by Keizer. The keel-tipped stylus 80 includes a dielectric support element 82. The dielectric support element 82 comprises a body 84 having bevelled surfaces 86 and 88, a fore-and-aft constricted terminal portion 90 and shoulders 92 and 94 joining the bevelled body to the constricted terminal portion.

The constricted terminal portion 90 is defined by a prow 96, a substantially flat rear surface 98 remote from the prow, a pair of substantially parallel side surfaces 100 and 102 extending from the side edges of the rear surface, a bottom surface 104 extending from the bottom edge of the rear surface and a pair of additional surfaces 106 and 108 extending from the prow and intersecting the bottom and the side surfaces. The intersection of the rear, the side and the additional surfaces with the bottom surface defines, illustratively, a pentagonal stylus footprint. The keel-tipped stylus is constructed such that an apex of the pentagonal footprint is located on the prow 96. The conducting layer 110 can be a metal such as titanium, hafnium, tantalum and the like. The bottom edge 116 of the conducting layer 110 engages the signal profile recorded on the video disc and constitutes the primary pickup electrode.

In the embodiment of FIGS. 1 and 2, the shoulders 92 and 94 are parallel to the bottom surface 104 of the constricted terminal portion 90. Alternatively, the shoulders 93 and 94 may be flared relative to the bottom surface 104.

Illustratively, the configuration of the keel-tipped stylus 80 is as follows: the angle included between the bevelled surfaces 86 and 88 is 42°; the height of the constricted portion 90 is 5 micrometers; the distance between the substantially parallel side surfaces of the constricted portion is 3 micrometers; the fore-and-aft dimension of the constricted portion is 8 micrometers; and the angle included between the prow 96 and the bottom surface 104 is 35°.

The metal conducting layer 110 can be about 1500 to 2000 angstroms thick. It can be deposited by conventional means onto surface 110 as by sputtering using a metal target.

During the metallization process it has been found that unwanted metal deposits on the prow 96 and bevelled edges 86 and 88 as well as on the desired surface. It is believed that the unwanted metal causes the observed variations in low frequency amplitude and the undesirable hissing on playback of the disc with the stylus by acting as a second electrode, electrically connected to the primary pickup electrode, which detects the low frequency sound carrier signal. The detected signals from these two electrodes may at times be in-phase and at times out-of-phase, which leads to the observed amplitude variations. The hissing is a result of insufficient sound carrier level to the second processing circuitry when the signal picked up by the second electrode opposes that picked up by the primary electrode.

Figure 3B:
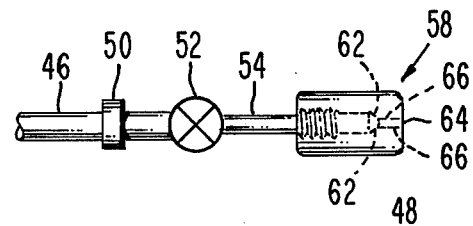
FIGS. 3a and 3b are cross-sectional views of a stream slurry lapping apparatus useful for carrying out the invention.
Figure 3A:
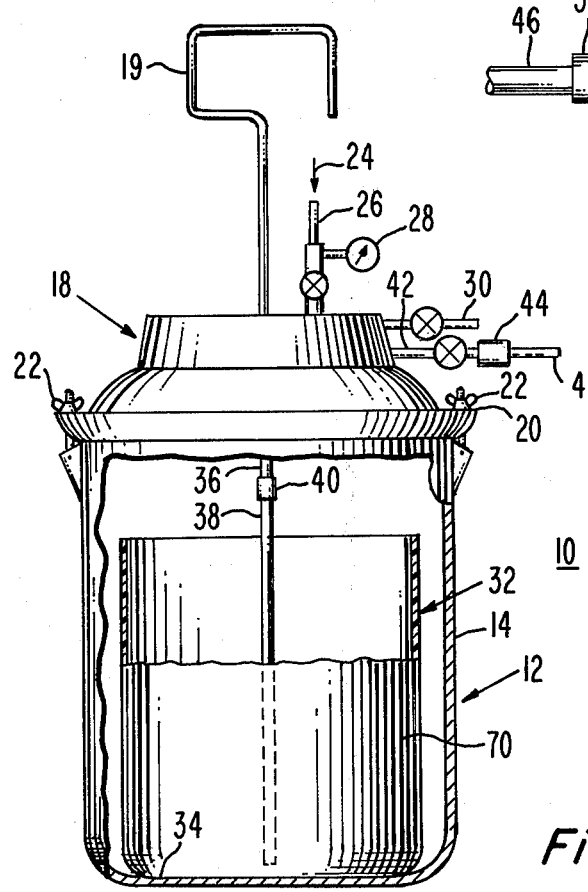

The problems associated with the "second electrode" can be overcome by removing the unwanted metal. Although the "second electrode" caused problems were encountered with the keel-tipped stylus of Keizer, other stylus structures should be subject to these problems and should be corrected by the present invention. Any method of selectively directing a suitable abrasive which will remove only the unwanted metal deposits may be used. FIGS. 3a and 3b are cross-sectional views of a stream slurry lapper 10 which may be employed in this invention. The stream slurry lapper 10 includes a galvanized steel pressure vessel 12 having a cylindrical wall 14, a circular base 16 and a cast iron top 18 coated with an aluminum paint. The top 18 is fastened to the pressure vessel 12 by means of six symmetrically disposed wing-nut clamps 22, of which two are shown. The top 18 is conveniently maneuvered by means of a handle 19.

The pressure vessel 12 is pressurized by means of a source of compressed air 24 which enters through an inlet tube 26. The compressed air pressure is controlled by means of a regulator 28. For the stream slurry lapper 10 described herein a suitable pressure is about 10–30 pounds per square inch (psi) (0.7–2.2 kilograms per square cm), preferably about 30 psi (2.2 kilograms per square cm). If a pressure below about 10 psi (0.7 kilograms per square cm) is used, the resulting stream of abrasive lacks the force to remove the unwanted metal deposit. If a pressure greater than about 30 psi (2.2 kilograms per square cm) is used, the fittings and tubing employed with the stream slurry lapper 10 described herein are unable to maintain their integrity. Pressure may be released from the vessel 12 by means of a first outlet 30.

A cylindrical container 32 within the pressure vessel 12 is used to hold an abrasive slurry 70. A suitable container 32 has about 3–4 liters capacity with a circular base 34. The container 32 may be constructed out of glass, metal or plastic, such as polyethylene.

A first tube 36, fabricated from a metal such as brass or stainless steel, extends down from the top 18 and is connected to a second tube 38, which may be a thick-wall rubber tube, by means of a first connector 40. The second tube 38 extends into the container 32. The first tube 36 is connected to a second outlet 42. The second outlet 42 is connected by means of a second connector 44 to a third tube 46, which may be a thick-walled rubber tube, which is joined to a nozzle 48.

The nozzle 48 can include a wire screen 50 with about 0.001 inch (25.4 micrometers) diameter openings, a valve 52 to control the flow rate of the slurry 70, a fourth tube 54, which may be constructed out of brass or stainless steel and a brass cap 58. The fourth tube 54 is screwed into one end of the cap 58. The other end of the cap 58 has an orifice 64 which is then joined by means of a bevel 62 to the screwed end.

The bevel 62 serves to minimize the buildup of particles at the entrance to the orifice 64. The walls 66 of the orifice 64 must be around 4–5 times as long as the diameter of the orifice 64 in order for the slurry 70 to have the proper exiting force. If the walls 66 are too short, the exiting slurry will spray out rather than exit in a stream in one direction. If the walls 66 are too long, the exiting slurry stream will lack sufficient force to abrade the unwanted metal deposited on the diamond stylus.

A diameter of 1/32 inch (0.079 cm) for the orifice 64 was found to be optimal for the apparatus 10 used. A smaller diameter opening clogs up too readily and a larger opening results in the need to replenish the slurry 70 in container 32 with greater frequency than for the smaller opening.

The slurry 70 can be a mixture of water and alumina. The slurry 70 is prepared by filling the container 32 with the appropriate amount of water, adding the alumina and mixing the components until a uniform slurry is obtained. Any mixing means such as stirring or shaking may be used. A volume-to-volume ratio of about 3 to 1 for water-to-alumina is preferred with the equipment described in FIGS. 3a and 3b. The 3 to 1 ratio is a function of the present equipment and alterations, such as the size of the tubing, orifice openings, and pressure, may change the optimal ratio. If a lower ratio is used, i.e., a more dilute slurry, a slower lapping rate is observed and ultimately the amount of abrasive present will be insufficient to remove the metal. If a greater ratio is used, i.e., a more concentrated slurry, the resulting slurry is too thick and clogs the lines. Furthermore, the thick slurry cannot be expelled from the nozzle at a sufficient force to effectively remove the unwanted metal deposit.

Alumina having about a 0.03 micrometer particle size is preferred for removing metal from the prow 96 or the bevelled surfaces 86 and 88 of a dielectric support element 82. A substantially larger alumina particle size may cause surface imperfections to form on the prow 96 or the bevelled surfaces 86 and 88. A substantially smaller alumina particle size may be unable to remove the unwanted metal deposits.

The stylus to be demetallized may be held in a pickup cartridge such as that described in Leedom, U.S. Pat. No. 4,049,280, incorporated herein by reference. The stylus pickup cartridge is clamped and the stream is directed perpendicular to the electrode face 110. The stream is therefore directed at the prow 96 and bevelled edges 86 and 88. The stream does not come in contact with electrode face 110 so that face does not have any of its desirable metal coating removed. It is preferred that the removal of the unwanted metal be done prior to the shaping of the stylus tip. The slurry stream may "wrap around" the electrode face and remove some of its metal. The signal output is adversely affected by the loss of the metal from the electrode face. Shaping the tip narrows the electrode face 110 at the sides 100 and 102, the regions from which the metal layer may have been removed because of slurry wrap around.

Generally, for the stream slurry apparatus described, about 1 minute is required to remove any unwanted metal. The stylus is then cleaned, for example, with isopropanol.

The slurry, after mixing, has a limited useable lifetime. It was found that after about 5 minutes, the slurry was no longer effective because the alumina particles were settling to the bottom of the container 32. If the slurry is continually agitated in such a manner as to prevent settling out of the alumina particles and the slurry 70 cn be replenished automatically, then the stream slurry lapping can be employed as a continuous process rather than a batch process.

The invention will be further illustrated by the following Example, but it is to be understood that the invention is not meant to be limited by the details described therein.

EXAMPLE

Slurry lapping of video disc styli was performed using a stream slurry lapper 10 similar to that shown in FIGS. 3a and 3b. The pressure vessel 12 was a conventional paint sprayer having a cylindrical wall 14 about 24 inches (61.0 cm) high, a circular base 16 about 12 inches (30.5 cm) in diameter, and an aluminum painted coated cast iron top 18 having a diameter of about 17 inches (43.2 cm) where the top 18 is fastened to the pressure vessel 12.

A four liter polyethylene container 32 for the slurry was used having a base 34 about 7 inches (17.8 cm) in diameter. The container was filled with 4 liters of a 3:1 by volume mixture of water-to-alumina. Linde Type A alumina having a particle size of 0.03 micrometer was employed. The water-alumina mixture was mixed with a 55 watt stirring motor (available from Talboys Eng. Corp., Emerson, New Jersey) fitted with a Teflon propeller-type stirrer operating at 1500 revolutions per minute. The resulting slurry was used within five minutes of mixing. The first and fourth tubes, 36 and 54, respectively, had a 0.25 inch (0.635 cm) inside diameter. The second and third tubes, 38 and 46, respectively, were fabricated out of butyl rubber with an inside diameter of 0.25 inch (0.635 cm) and a wall 0.062 inch (0.16 cm) thick. The orifice 58 was about 1/32 inch (0.079 cm) in diameter. The vessel 12 was pressurized with compressed air to a pressure of 30 psi (2.2 kilograms per square cm).

Each stylus was mounted in a cartridge and the slurry stream was directed at the prow 96 of the stylus for 1 minute. The styli were then swabbed clean with isopropanol and allowed to dry. Next, the styli were keel lapped as described in Keizer, U.S. Pat. No. 4,104,832, incorporated herein by reference, using an abrasive silicon oxide coating.

A 12 inch (30.5 cm) diameter carbon filled vinyl disc having an audio carrier signal of 0.716 megahertz and a video carrier signal of 5 megahertz impressed in the bottom of the grooves was coated with a 200 angstrom thick coating of a lubricant. Of 39 styli tested, 20 were slurry lapped using the apparatus 10 of FIGS. 3a and 3b, the other 19 (controls) were not treated to remove any metal which may have deposited on the prow 96 or bevelled edges 86 and 88.

The low frequency response of the styli to the recorded audio signal was measured with a Hewlett Packard Model 8553 Spectrum Analyzer in 10 second sweeps. The audio carrier signal was measured within the region having a diameter of about 7–10 inches (22.9–25.4 cm), the "outside" portion of the disc and within the region having a diameter of about 3–5 inches (7.6–12.7 cm), the "inside" portion of the disc. The results are summarized in the Table. The signal picked up by the stylus as measured with the Spectrum Analyzer set in the 716 kilohertz range was recorded. The variation in the amplitude between the maximum and minimum values during the 10 second sweeps are listed in the Table.

The amplitude vs. frequency was also plotted for a 10 second sweep from 0.1 kilohertz to 1 megahertz. A dip in the plotted curve is believed to be due to the signal from the non-electrode face metal deposits interfering with the signal from the keel electrode 110. The rank was assigned primarily according to the depth of the dip in the curve and secondarily by the breadth of the dip. A rank of "1" is the worst and corresponds to the greatest amount of interference between the prow and keel electrodes and hence the most severe dip.

TABLE

|  | Audio Carrier Amplitude (decibels (db)) | | Outside Variation | |
| --- | --- | --- | --- | --- |
|  | Outside | Inside | (db) | Rank |
| Slurry Lapped Styli | | | | |
| mean | −25.4 | −24.45 | 2.50 | 27.6 |
| standard deviation | 3.78 | 2.37 | 0.61 | — |
| Control Styli | | | | |
| mean | −25.74 | −24.94 | 4.26 | 12.00 |
| standard deviation | 2.45 | 2.41 | 2.88 | — |

Within experimental error there was no difference in the intensity of the mean audio carrier signal amplitude of the slurry lapped and control styli at the outside and inside portions of the disc. However, there was a greater variation in the outside audio carrier signal amplitude in the controls. The greater variation is caused by an out-of-phase contribution caused by metal deposition on the prow 96 and the bevelled edges 86 and 88. These out-of-phase contributions are associated with a hissing noise in the audio.

The comparative ranks are also indicative of the effects of the unwanted metal deposits. The mean rank of the control styli was markedly lower than the slurry lapped styli. Furthermore, those of lowest rankings, numbers 1-12 were all control sytli, while whose ranked above 28 were all slurry lapped styli.

We claim:

1. A method for improving the quality of the low frequency signals recovered by a video disc playback stylus having on one face of a dielectric support element a deposited conductive metal electrode which comprises the step of directing a suitable abrasive onto the dielectric support element so as to remove metal deposited on non-electrode surfaces.

2. The method of claim 1 wherein removing the metal deposited on non-electrode surfaces comprises the steps of:
   pressurizing a slurry of an abrasive,
   directing the slurry through an orifice,
   releasing a stream of the slurry, and
   placing the non-electrode surfaces containing metal deposits in the oncoming stream until the metal deposits are removed.

3. The method of claim 2 wherein the abrasive slurry is an aqueous slurry of alumina.

4. The method of claim 3 wherein the particle size of the alumina is about 0.03 micrometer.

5. The method of claim 3 wherein the ratio by volume of water to alumina is about 3:1.

* * * * *

UNITED STATES PATENT AND TRADEMARK OFFICE
CERTIFICATE OF CORRECTION

PATENT NO. : 4,287,689

DATED : September 8, 1981

INVENTOR(S) : Michael Jordon Mindel, Michael Evans Miller, James Conrad Rustman, Richard Claxton Palmer.

It is certified that error appears in the above-identified patent and that said Letters Patent is hereby corrected as shown below:

Column 2, line 44, delete "second" and insert -- sound --.

Column 4, line 36, delete "cn" and insert -- can --.

Signed and Sealed this

Twenty-second Day of December 1981

|SEAL|

Attest:

GERALD J. MOSSINGHOFF

Attesting Officer    Commissioner of Patents and Trademarks